United States Patent
Kobayashi et al.

(10) Patent No.: US 7,009,385 B2
(45) Date of Patent: Mar. 7, 2006

(54) FLUX COMPENSATED ROTATIONAL POSITION DETECTOR AND OPERATING METHODS THEREFOR

(75) Inventors: Masahiro Kobayashi, Tokyo (JP); Hiroyuki Kujirai, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 144 days.

(21) Appl. No.: 10/396,507

(22) Filed: Mar. 26, 2003

(65) Prior Publication Data

US 2004/0066184 A1  Apr. 8, 2004

(30) Foreign Application Priority Data

Mar. 27, 2002 (JP) ............................. 2002-089478

(51) Int. Cl.
*G01B 7/30* (2006.01)
*G01D 5/20* (2006.01)

(52) U.S. Cl. .................... 324/207.12; 324/207.25; 324/207.17; 310/68 B; 318/653

(58) Field of Classification Search .......... 324/207.12, 324/207.17, 207.18, 207.19, 207.25, 163–174; 310/68 B, 168, 111; 318/653, 605, 661
See application file for complete search history.

(56) References Cited

U.S. PATENT DOCUMENTS

| 3,501,664 | A | * | 3/1970 | Veillette ...................... 318/138 |
| 3,679,953 | A | * | 7/1972 | Bedford ....................... 318/138 |
| 3,705,343 | A | * | 12/1972 | Ringland et al. ........... 323/348 |
| 4,631,510 | A | * | 12/1986 | Nagarkatti et al. ......... 336/135 |
| 4,794,511 | A | * | 12/1988 | Lundin ........................ 363/156 |
| 5,025,201 | A | * | 6/1991 | Berger ......................... 318/605 |
| 5,444,368 | A | * | 8/1995 | Horber .................... 324/207.16 |
| 2004/0007926 | A1 | * | 1/2004 | Tsukada ................... 310/68 B |

FOREIGN PATENT DOCUMENTS

| JP | 5-252711 A | 9/1993 |
| JP | WO 02/25216 A1 | 9/2001 |
| JP | 2002-168652 | 6/2002 |

* cited by examiner

*Primary Examiner*—Jay Patidar
(74) *Attorney, Agent, or Firm*—Adduci, Mastriani & Schaumberg, LLP

(57) ABSTRACT

A flux compensated rotational position detector includes a rotating element having a plurality of magnetic poles extending over its entire periphery, and a fixed element having a plurality of protruding fixed-element magnetic poles with fixed-element magnetic pole teeth opposing the rotating element, and first and second compensating poles disposed on either side of the fixed-element magnetic poles, the first and second compensating poles having respective first and second magnetic pole teeth opposing the rotating element, wherein the fixed element does not form a closed magnetic path around the entire periphery of the rotating element, magnetizing windings are provided on all of the first and second compensating poles and the fixed-element magnetic poles, and sine output and cosine output windings are provided on each of the fixed element magnetic poles. Methods for operating the detector are also described.

14 Claims, 3 Drawing Sheets

US 7,009,385 B2

FLUX COMPENSATED ROTATIONAL POSITION DETECTOR AND OPERATING METHODS THEREFOR

BACKGROUND OF THE INVENTION

The present invention relates generally to rotational position detectors. More specifically, the present invention relates to rotational position detectors employing both sensor winding and flux compensation windings. Methods for operating the rotational position detector are also disclosed.

The present invention claims priority from Japanese Patent Application 2002-089478, which was filed on Mar. 27, 2002, and which is incorporated herein by reference in its entirety.

Resolvers are employed in multiple applications, such as detecting rotational position. One type of resolver is a synchro signal generator where a signal is output from output windings. It will be appreciated that the frequency of the output signal is modulated according to the X and Y components of the rotational angle of a rotating element disposed within output windings. Such resolvers are often used in applications including the detection systems of conventional servomechanisms, trigonometric calculation devices, the control systems associated with automobile steering equipment, etc.

One example of such a resolver is a device known as a "variable reluctance resolver," which has a structure such that a plurality of poles are formed on the fixed element, magnetizing windings and output windings are wound on the same poles of the fixed element, and the sum of the output windings on the plurality of poles is obtained as the output of a single output winding. In such variable reluctance resolvers, the output voltage, $V_x$, of the output winding that outputs the X-direction component of the rotating element is given by Equation 1 in which $E \sin \omega t$ is the alternating current (AC) voltage, $V_P$, applied to the magnetizing windings. Here, $\omega$ is angular frequency, which can be is represented by $2\pi f$, where f is frequency, and K is a constant determined by the magnetizing windings, the output windings, and the characteristics of the rotating element and fixed element.

$$V_x = K \sin \theta \cdot E \sin \omega t \quad \text{(Eq. 1)}$$

In the same way, the output of the output winding that outputs the Y-direction component of the rotating element can be represented by Equation 2 because it is wound with a phase shift of 90° relative to the rotating element.

$$V_y = K \cos \theta \cdot E \sin \omega t \quad \text{(Eq. 2)}$$

The variable reluctance resolver includes a rotating element disposed in the center of a fixed element. It will be noted that the fixed element has a plurality of magnetic poles protruding from an annular (ring-shaped) yoke. Moreover, it has fixed-element windings wound on those magnetic poles. This structure is shown in FIG. 4, wherein fixed element 52 forms the annular shape, and rotating element 14, which is coupled to rotary shaft 13, passes therethrough.

In FIG. 4, magnetic pole teeth 4 of fixed-element core 1 are formed on the inner side of fixed element 52 and are made to face the surface of the outer side of rotating element 14. A plurality of fixed elements on which fixed-element windings 50 are wound are formed on the entire inside perimeter of fixed-element core 1. Rotating element 14 is inserted into the inside of fixed-element core 1, and the rotational angle of that rotating element 14 is detected by methods that are well known to one of ordinary skill in the art.

It will be appreciated that the structure depicted in FIG. 4 is difficult to repair. In other words, fixed-element 14, coupled to rotary shaft 13, passes through the inside of fixed element 52, which forms an annular shape. As a result, in cases where the fixed element 52 must be changed due to damage, such as impact damage to the fixed element 52 from an accident, a broken wire in fixed winding 50, insulation failure, etc., it is necessary to remove the rotary shaft 13 to take off fixed element 52. Moreover, because rotary shaft 13 is attached to other equipment, in some cases it is necessary to disassemble that equipment before it is possible to remove the rotary shaft 13. As a result, a lengthy change out time with a commensurate large labor expense may be incurred in order to replace fixed element 52.

Several resolver designs are known that, in order to achieve reduced size of the resolver, do not form a closed magnetic path around the entire periphery of the rotating element. For example, Japanese Unexamined Patent Application Publication H5-252711 discloses a resolver in which the yoke of the detection head consists of two mutually parallel yokes, formed along the direction of travel of the inductor and joined by means of a connecting part at the center to form a shape like the letter H. The magnetic pole teeth formed at both ends of it and the iron core teeth of the inductor are placed in opposition. Thus, two magnetic circuits are formed between the inductor and the detection head so that a permeance change generates a 90° phase difference. It will be appreciated that permeance is a measure of the ability of a magnetic circuit to conduct magnetic flux; thus, it is the reciprocal of reluctance. In contrast, WO 02/25216 A1 discloses a resolver in which, if the motor pole logarithm is n, a detection part is positioned relative to the rotor within a probability range of 2p/n.

Moreover, Japanese Unexamined Patent Application Publication 2002-168652 discloses a nX reluctance resolver that is configured from an inductance type rotor, rotating about a rotational axis, and a stator. The stator core comprises a yoke shaped as a circular arc, positioned within an angular range for a mechanical angle of 360°/n (where n is a positive integer greater than or equal to 2), and 4×k magnetic pole parts (where k is also a positive integer but k is greater than or equal to 1), connected to the yoke and arranged at specified intervals. On each magnetic pole, a magnetizing winding is wound. On every other magnetic pole part, i.e., on odd numbered poles, a first detection-use winding is wound, while on the remaining every other magnetic pole parts, i.e., on even numbered poles, a second winding is wound, which second windings are also employed in position detection.

It will be appreciated that in the reduced size resolvers discussed immediately above, the magnetic flux at the ends of, for example, the arcuate yoke varies with respect to that in the vicinity of the central windings. It will also be appreciated that this variable flux profile reduces the accuracy of these abbreviated resolvers as compared to resolvers employing annular yokes. What is needed is a resolver employing an arcuate or partial yoke that is not subject to flux profile variations.

SUMMARY OF THE INVENTION

Based on the above and foregoing, it can be appreciated that there presently exists a need in the art for a flux compensated rotary position detector that overcomes the above-described deficiencies. The present invention was motivated by a desire to overcome the drawbacks and shortcomings of the presently available technology, and thereby fulfill this need in the art.

According to one aspect, the present invention provides a flux compensated rotational position detector, including a rotating element having a plurality of magnetic poles extending over its entire periphery, and a fixed element having a plurality of protruding fixed-element magnetic poles with fixed-element magnetic pole teeth opposing the rotating element, and first and second compensating poles disposed on either side of the fixed-element magnetic poles, the first and second compensating poles having respective first and second magnetic pole teeth opposing the rotary element, wherein the fixed element does not form a closed magnetic path around the entire periphery of the rotating element, magnetizing windings are provided on all of the first and second compensating poles and the fixed-element magnetic poles, and sine output and cosine output windings are provided on each of the fixed element magnetic poles. If desired, the sine and cosine output windings are wound on the fixed-element magnetic poles such that outputs of these windings are proportional to the sine of the angle and cosine of the angle of the rotating element, respectively.

In an exemplary case, the fixed element also provides structure for fixing the position of the fixed element relative to the rotating element. This structure also permits movement of the fixed element without movement of the rotating element. If desired, this structure can be first and second through holes allowing the fixed element to be attached to any element convenient to the flux compensated rotational position detector. In another exemplary case, the fixed element magnetic poles include N magnetic poles, the $1^{st}$ and $N^{th}$ ones of the N magnetic poles are disposed between the first and second compensating magnetic poles, the magnetizing windings associated with the first and second compensating magnetic poles tailor magnetic flux profiles in the vicinity of the $1^{st}$ and $N^{th}$ of the N magnetic poles such that the magnetic flux profiles on either side of both the $1^{st}$ and $N^{th}$ magnetic poles are substantially similar, and N is a positive integer greater than or equal to 2.

According to another aspect, the present invention provides a flux compensated rotational position detector, including a rotating element having a plurality of magnetic poles extending over its entire periphery, a fixed element having protruding fixed-element N magnetic poles with respective fixed-element magnetic pole teeth opposing the rotating element, and first and second compensating flux generators for generating compensating magnetic flux, wherein the fixed element does not form a closed magnetic path around the entire periphery of the rotating element, magnetizing windings, sine output windings, and cosine output windings are provided on each of the N magnetic poles, the compensating magnetic flux tailors flux profiles adjacent to the $1^{st}$ and $N^{th}$ ones of the N magnetic poles, and N is a positive, even integer. If desired, the sine and cosine output windings are wound on the N magnetic poles such that outputs of these windings are proportional to the sine of the angle and cosine of the angle of the rotating element, respectively.

In an exemplary case, the compensating flux generators include respective first and second compensating poles disposed on either side of the N magnetic poles, the first and second compensating poles having respective first and second magnetic pole teeth opposing the rotary element, the first and second compensating poles supporting only magnetizing windings.

According to a further aspect, the present invention provides a method of operating a rotational position detector including a rotating element having multiple magnetic poles and a fixed element having N protruding fixed-element magnetic poles with fixed-element magnetic pole teeth opposing the rotating element, wherein the fixed element does not form a closed magnetic path around the entire periphery of the rotating element, the magnetic poles supporting magnetizing windings, sine output windings, and cosine output windings, N being a positive integer greater than 2, including steps of generating compensating magnetic flux proximate to opposing sides of $1^{st}$ and $N^{th}$ of the N magnetic poles, energizing the magnetizing windings, and determining the position of the rotating element based on output voltages generated by the sine and cosine output windings.

According to a still further aspect, the present invention provides a method of operating a flux compensated rotational position detector including a rotating element having a plurality of magnetic poles extending over its entire periphery, and a fixed element having protruding fixed-element N magnetic poles with respective fixed-element magnetic pole teeth opposing the rotating element, wherein the fixed element does not form a closed magnetic path around the entire periphery of the rotating element, and magnetizing windings, sine output windings, and cosine output windings are provided on each of the N magnetic poles, N being a positive, even integer, including steps of tailoring flux profiles adjacent to the $1^{st}$ and $N^{th}$ ones of the N magnetic poles, and determining the position of the rotating element based on voltage applied to the magnetizing windings and output voltages generated by the sine and cosine output windings.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 1(a) is a frontal cross-section view, while FIG. 1(b) is a cross section view taken along the line 1B—1B in FIG. 1(a);

DETAILED DESCRIPTION OF THE PREFERRED EMBODIMENTS

FIGS. 1(a) and 1(b) collectively illustrate an exemplary embodiment of a rotational position detector 1 employing a fixed-element magnetic pole assembly according to the present invention. More specifically, FIG. 1(a) illustrates a frontal cross-sectional view, while FIG. 1(b) is a cross section view taken along the line 1B—1B in FIG. 1(a). Before discussing the exemplary embodiment of the flux compensated rotational position detector 1, it will be noted that the discussion which follows is made in terms of a resolver with 4 fixed-element magnetic poles and 6 rotating-element magnetic poles. However, it is also acceptable for the relationship between the number of fixed-element magnetic poles and the number of rotating-element magnetic poles is different. As will be explained below, compensating magnetic poles are provided at both sides of the fixed-element magnetic poles on which output windings are wound and, on these compensating magnetic-poles, only magnetizing windings are wound.

Figure 1:
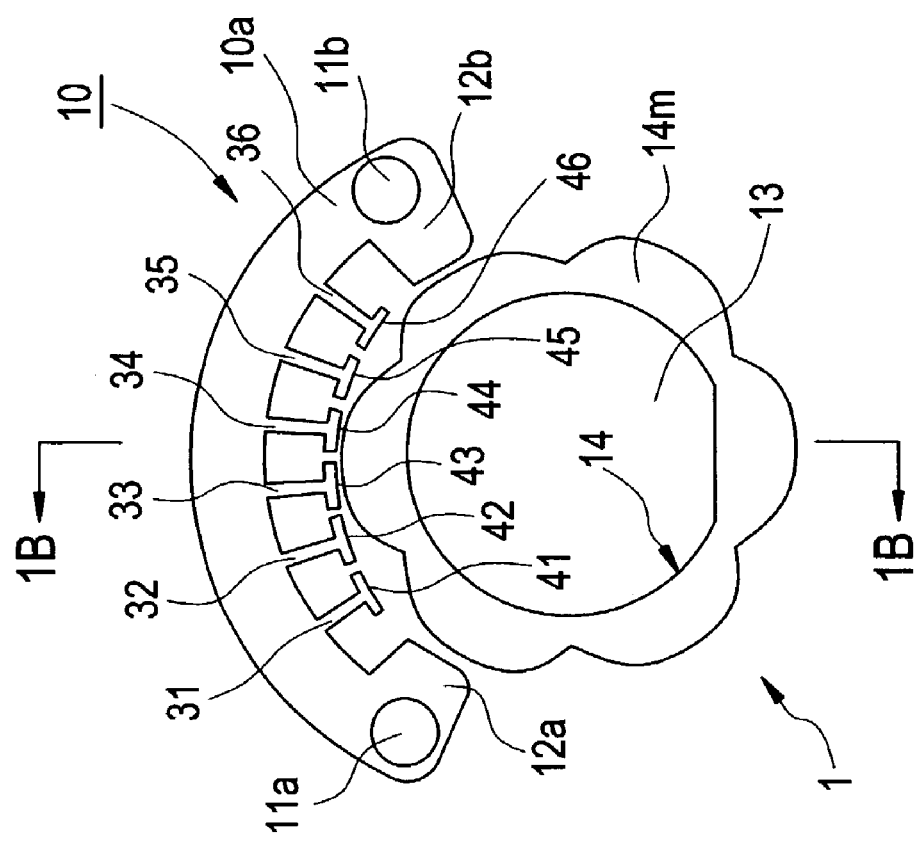
FIGS. 1(a) and 1(b) collectively illustrate an exemplary embodiment of a flux compensated rotational position detector according to the present invention, where

The magnetizing windings and the output windings that are wound on the fixed-element magnetic poles are not shown in FIG. 1(*a*); however, these windings are collectively illustrated in profile in FIG. 1(*b*). Rotating element 14, which is secured to rotary shaft 13, is formed from laminated silicon steel plates or the like. It will be appreciated that rotating element 14 includes a plurality of magnetic poles 14*m* extending over its entire periphery, i.e., circumference. Provided outside of rotating element 14 is a fixed element 10, which can also be formed of laminated silicon steel plates or the like. In an exemplary and non-limiting case where the fixed element 10 is formed from a stack of laminated silicon steel plates, the fixed element 10 includes a plurality of fixed-element magnetic poles 32, 33, 34, and 35, to which are formed respective magnetic pole teeth 42, 43, 44, and 45 orientated in a direction facing rotating element 14, and compensating magnetic poles 31 and 36 to which are formed respective compensating magnetic pole teeth 41 and 46. All of these elements can be collectively termed yoke 10*a*.

At both ends of yoke 10*a*, through holes 11*a* and 11*b* are formed to secure fixed element 10 to a case (not shown). Fixed element 10 is secured to the case by means of screws or the like (also not shown). In addition, at both ends of yoke 10*a*, protrusion portions 12*a* and 12*b* are formed respectively, so that the diameter of through holes 11*a* and 11*b* can increased. It will be appreciated from FIG. 1(*a*) that fixed element 10 doesn't form a closed magnetic path going around the entire periphery of rotating element 14. Consequently, by removing the screws (not shown) from through holes 11*a* and 11*b*, fixed element 10 can be easily separated from the case.

As best seen in FIG. 1(*b*), the magnetizing windings and output windings, which are wound on the fixed-element magnetic poles 32–35 and the compensating magnetic poles 31 and 36 and are collectively indicated by numeral 15, are each wound around the teeth in a manner which will be explained in conjunction with FIG. 2 and Tables I, II, and III.

Figure 2:
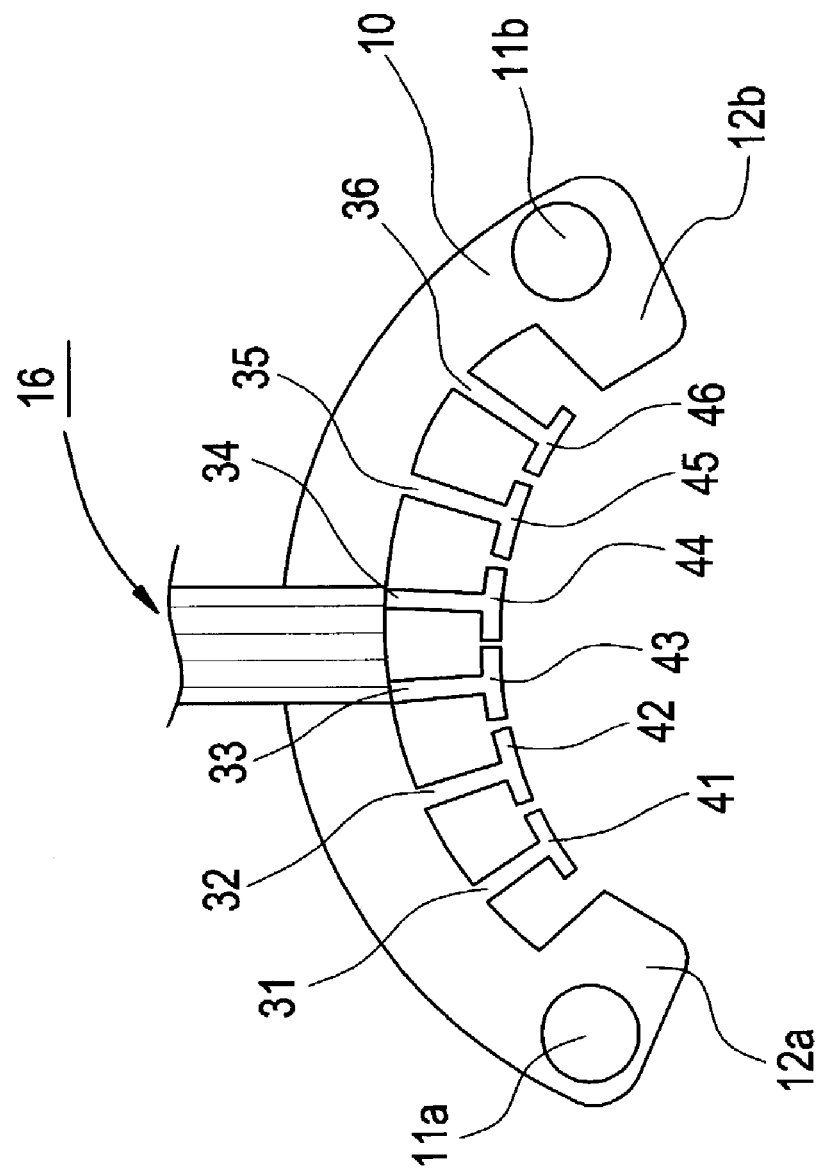
FIG. 2 is a drawing explaining the fixed-element magnetic pole numbers, which drawing facilitates an understanding of the winding patterns employed in the manufacturing of the magnetizing windings, the sine output windings, and the cosine output windings in the exemplary embodiment according to the present invention illustrated in FIG. 1(a)
Figure 4:
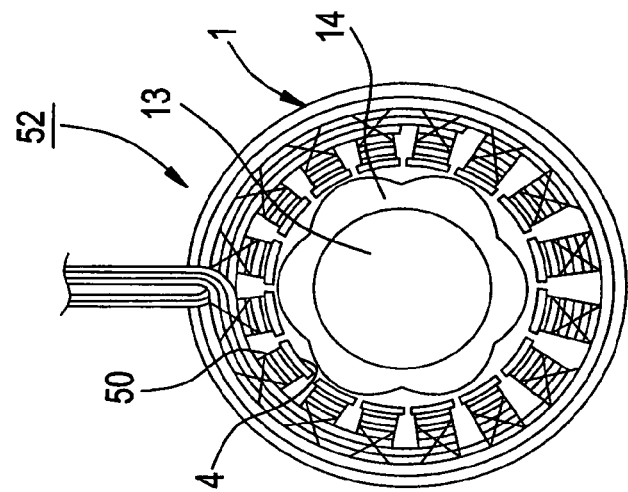
FIG. 4 illustrates a conventional, annular variable reluctance resolver.

FIG. 2 illustrates the element 10 in isolation, which facilitates understanding of the fixed-element magnetic pole and compensating magnetic pole numbering system, while Tables I, II, and III denote the winding patterns of the magnetizing windings, the sine output windings, and the cosine output windings, respectively, employed in winding coils on various magnetic poles. The magnetizing winding pattern will first be explained following which the winding patterns for the sine and cosine output windings will be explained.

TABLE I

| Coil Sequence | Magnetic Pole Number | Number of Coils | Winding Direction |
| --- | --- | --- | --- |
| 1 | 31 | +T1 | CW |
| 2 | 32 | −T1 | CCW |

TABLE I-continued

| Coil Sequence | Magnetic Pole Number | Number of Coils | Winding Direction |
| --- | --- | --- | --- |
| 3 | 33 | +T1 | CW |
| 4 | 34 | −T1 | CCW |
| 5 | 35 | +T1 | CW |
| 6 | 36 | −T1 | CCW |

TABLE II

| Coil Sequence | Magnetic Pole Number | Number of Coils | Winding Direction |
| --- | --- | --- | --- |
| — | — | — | — |
| 7 | 32 | +T2 | CW |
| 8 | 33 | −T2 | CCW |
| 9 | 34 | −T2 | CCW |
| 10 | 35 | +T2 | CW |
| — | — | — | — |

TABLE III

| Coil Sequence | Magnetic Pole Number | Number of Coils | Winding Direction |
| --- | --- | --- | --- |
| — | — | — | — |
| 11 | 32 | +T2 | CW |
| 12 | 33 | +T2 | CW |
| 13 | 34 | −T2 | CCW |
| 14 | 35 | −T2 | CCW |
| — | — | — | — |

Referring to Table I, the magnetizing windings having a wiring turn count of T1 and are wound on compensating magnetic pole 31, fixed-element magnetic poles 32, 33, 34, and 35 and compensating magnetic pole 36, in that order. As for the directing of winding, one direction (indicated by the code, CW) is the same for compensating magnetic pole 31 and fixed-element magnetic poles 33 and 35, and the other direction (indicated by the code, CCW) is the same for fixed-element magnetic poles 32 and 34 and compensating magnetic pole 36. Thus, the direction is different for compensating magnetic pole 31 and fixed-element magnetic poles 33 and 35 compared to that for fixed-element magnetic poles 32 and 34 and compensating magnetic pole 36. In other words, the windings are wound so that the polarity of each of the magnetic poles of compensating magnetic pole 31, fixed-element magnetic poles 32, 33, 34, and 35, and compensating magnetic pole 36 are mutually different from that on any adjacent magnetic pole(s).

It will be appreciated from Table II that the sine output windings are wound only on the fixed-element magnetic poles 32, 33, 34, and 35. The sine output windings are not wound on either of the compensating magnetic poles 31 and 36. It will also be appreciated that the number of wire turns employed in the sine output windings is T2. The winding direction is the same for fixed-element magnetic poles 32 and 35 (shown by code CW), which is opposite that of the direction employed in winding fixed-element magnetic poles 33 and 34 (shown by code CCW), i.e., the direction for fixed-element magnetic poles 32 and 35 is different from that for fixed-element magnetic poles 33 and 34. As a result, in the sine output windings, an output is obtained proportional to the sine of the rotational angle of the rotating element. It should be mentioned that the winding directions indicated by the CW and CCW designations in Table II are the same as the winding directions for the magnetizing windings found in Table I.

Referring to Table III, the cosine output winding is wound only on the fixed-element magnetic poles 32, 33, 34, and 35; it is not wound on the compensating magnetic poles 31 and 36. The number of wire turns in the cosine output winding is T2, the same as the number of wire turns of the sine output windings. The winding direction is the same for fixed-element magnetic poles 32 and 33 (shown by code CW) and the same for fixed-element magnetic poles 34 and 35 (shown by code CCW), i.e., the direction for fixed-element magnetic poles 32 and 33 is opposite that employed for fixed-element magnetic poles 34 and 35. Again, the winding directions indicated by codes CW and CCW are the same as the winding directions for the magnetizing windings. As a result, in the cosine output windings, an output is obtained proportional to the cosine of the rotational angle of the rotating element. Lead wires 16 of each winding, wound as mentioned above, can be brought to the exterior of yoke 10a by commonly known techniques.

Figure 3:
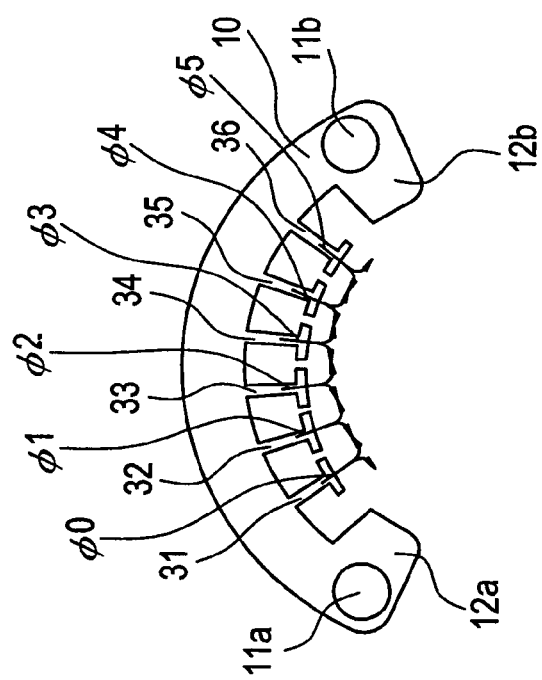
FIG. 3 is a drawing for explaining the operation of the compensating magnetic poles.

FIG. 3 illustrates the operation of the compensating magnetic poles 31 and 36. The voltages induced in the sine windings and the cosine windings, as shown in Equations (1) and (2) are proportional to the voltage applied to the magnetizing windings. Furthermore, as is clear from FIG. 3, in regard to magnetic flux $\phi 0$ induced in compensating magnetic pole 31 by means of the magnetizing winding, while one end of compensating magnetic pole 31 is adjacent to fixed-element magnetic pole 32, there is no magnetic pole on the other side, but only protrusion portion 12a. As a result, magnetic flux $\phi 0$ will not be the same magnetic flux as that of fixed-element magnetic poles 32, 33, 34, and 35. In the same way, in regard to magnetic flux $\phi 5$ induced in compensating magnetic pole 36 by means of the magnetizing winding, while one end of compensating magnetic pole 36 is adjacent to fixed-element magnetic pole 35, there is no magnetic pole on the other side, but only protrusion portion 12b. As a result, magnetic flux $\phi 5$ will not be the same magnetic flux as that of fixed-element magnetic poles 32, 33, 34, and 35.

On the other hand, magnetic fluxes $\phi 1$, $\phi 2$, $\phi 3$, and $\phi 4$, induced in fixed-element magnetic poles 32, 33, 34, and 35 by means of the magnetizing windings, do not become disturbed, i.e., the magnetic flux profile does not fall of precipitously, because at either end of each there is a compensating magnetic pole or a fixed-element magnetic pole. Thus, magnetic fluxes $\phi 1$, $\phi 2$, $\phi 3$, and $\phi 4$ are equal and, as a result, the voltages induced in the sine windings or cosine windings wound on fixed-element magnetic poles 32, 33, 34, and 35, which lie between compensating magnetic poles 31 and 36, can be obtained that are proportional to the voltages applied to the magnetizing windings, as indicated in Equations (1) and (2).

As indicated above, fixed element 10 has only the few fixed element magnetic poles 32, 33, 34, and 35 and compensating magnetic poles 31 and 36 facing in the direction of rotating element 14. In addition, due to the size and location of protrusion portions 12a and 12b formed, one at either end of yoke 10a, which enables the hole diameter of through holes 11a and 11b to be made large, it is possible to mount fixed element 10 securely to a case or other structural component. Furthermore, because its overall shape is not an annular shape, in the event of trouble, exchange can be performed easily. Moreover, the flux compensated rotational position detector according to the present invention functions as a resolver with accuracy similar to that of a conventional resolver.

It will be appreciated that the increased accuracy of the flux compensated rotational position detector according to the present invention, an exemplary embodiment of which is illustrated in FIGS. 1(a)–3, inclusive, is achieved without increasing the difficulty or the amount of labor associated with respect to exchange of the fixed-element magnetic pole assembly. In other words, the present invention provides a rotational position detector that enables easy replacement of the fixed element magnetic pole assembly.

In summary, a rotational position detector includes a rotating element 14, which is secured to a rotary shaft 13, and fixed element 10 disposed on the outside of the rotating element 14. In an exemplary case, fixed element 10 includes fixed element magnetic poles 32, 33, 34, and 35 and compensating magnetic poles 31 and 36. These magnetic poles advantageously can be integrated in yoke 10a. On both ends of yoke 10a, through holes 11a and 11b are formed via which fixed element 10 is secured to the case by a screw or the like. In addition, protrusion portions 12a and 12b are formed on both ends of yoke 10a, and fixed element 10, because it does not form a closed magnetic path around the entire periphery of rotating element, can be easily removed from the case. On fixed-element 10, magnetic poles 32, 33, 34, and 35, magnetizing windings and output windings are wound, while on compensating magnetic poles 31 and 36, only magnetizing windings are wound. The compensating magnetic poles generate compensating magnetic flux, which is employed to tail the flux profiles adjacent to the compensating magnetic poles, e.g., magnetic poles 32 and 35.

Moreover, it will be appreciated that provides a method of operating a rotational position detector including a rotating element having multiple magnetic poles and a fixed element having N protruding fixed-element magnetic poles with fixed-element magnetic pole teeth opposing the rotating element, wherein the fixed element does not form a closed magnetic path around the entire periphery of the rotating element, the magnetic poles supporting magnetizing windings, sine output windings, and cosine output windings, N being a positive integer greater than 2. The method advantageously includes steps for generating compensating magnetic flux proximate to opposing sides of $1^{st}$ and $N^{th}$ of the N magnetic poles, energizing the magnetizing windings, and determining the position of the rotating element based on output voltages generated by the sine and cosine output windings.

Stated another way, one exemplary embodiment of the present invention is a method of operating a flux compensated rotational position detector including a rotating element having a plurality of magnetic poles extending over its entire periphery, and a fixed element having protruding fixed-element N magnetic poles with respective fixed-element magnetic pole teeth opposing the rotating element, wherein the fixed element does not form a closed magnetic path around the entire periphery of the rotating element, and magnetizing windings, sine output windings, and cosine output windings are provided on each of the N magnetic poles, N being a positive, even integer. In this embodiment, the method includes steps for tailoring flux profiles adjacent to the $1^{st}$ and $N^{th}$ ones of the N magnetic poles, and then determining the position of the rotating element based on voltage applied to the magnetizing windings and output voltages generated by the sine and cosine output windings. It will be appreciated from the discussion above that tailoring the flux profiles near magnetic poles at either end of a row of magnetic poles permits position determination with increased accuracy.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A flux compensated rotational position detector, comprising:
   a rotating element having a plurality of magnetic poles extending over its entire periphery; and
   a fixed element having:
   a plurality of protruding fixed-element magnetic poles with fixed-element magnetic pole teeth opposing the rotating element; and
   first and second compensating poles disposed on either side of the fixed-element magnetic poles, the first and second compensating poles having respective first and second magnetic pole teeth opposing the rotating element,
   wherein:
   the fixed element does not form a closed magnetic path around the entire periphery of said rotating element;
   magnetizing windings are provided on all of the first and second compensating poles and the fixed-element magnetic poles; and
   sine output and cosine output windings are provided on each of the fixed element magnetic poles.

2. The flux compensated rotational position detector as recited in claim 1, wherein the sine and cosine output windings are wound on the fixed-element magnetic poles such that outputs of these windings are proportional to the sine of the angle and cosine of the angle of the rotating element, respectively.

3. The flux compensated rotational position detector as recited in claim 1, wherein the fixed element provides means for fixing the position of the fixed element relative to the rotating element.

4. The flux compensated rotational position detector as recited in claim 3, wherein the fixing means permits movement of the fixed element without movement of the rotating element.

5. The flux compensated rotational position detector as recited in claim 3, wherein the fixing means comprises first and second through holes.

6. The flux compensated rotational position detector as recited in claim 1, wherein:
   the fixed element magnetic poles comprise N magnetic poles;
   the $1^{st}$ and $N^{th}$ ones of the N magnetic poles are disposed between the first and second compensating magnetic poles;
   the magnetizing windings associated with the first and second compensating magnetic poles tailor magnetic flux profiles in the vicinity of the $1^{st}$ and $N^{th}$ of the N magnetic poles such that the magnetic flux profiles on either side of both the $1^{st}$ and $N^{th}$ magnetic poles are substantially similar; and
   N is a positive integer greater than or equal to 2.

7. A flux compensated rotational position detector, comprising:
   a rotating element having a plurality of magnetic poles extending over its entire periphery; and
   a fixed element having protruding fixed-element N magnetic poles with respective fixed-element magnetic pole teeth opposing the rotating element; and
   first and second flux compensating means for generating compensating magnetic flux,
   wherein:
   the fixed element does not form a closed magnetic path around the entire periphery of said rotating element;
   magnetizing windings, sine output windings, and cosine output windings are provided on each of the N magnetic poles;
   the compensating magnetic flux tailors flux profiles adjacent to the $1^{st}$ and $N^{th}$ ones of the N magnetic poles; and
   N is a positive, even integer.

8. The flux compensated rotational position detector as recited in claim 7, wherein the sine and cosine output windings are wound on the N magnetic poles such that outputs of these windings are proportional to the sine of the angle and cosine of the angle of the rotating element, respectively.

9. The flux compensated rotational position detector as recited in claim 7, wherein the fixed element further comprises means for fixing the position of the fixed element relative to the rotating element.

10. The flux compensated rotational position detector as recited in claim 9, wherein the fixing means permits movement of the fixed element without movement of the rotating element.

11. The flux compensated rotational position detector as recited in claim 9, wherein the fixing means comprises first and second through holes.

12. The flux compensated rotational position detector as recited in claim 7, wherein the flux compensating means comprises first and second compensating poles disposed on either side of the N magnetic poles, the first and second compensating poles having respective first and second magnetic pole teeth opposing the rotating element, the first and second compensating poles supporting only magnetizing windings.

13. A method of operating a rotational position detector including a rotating element having multiple magnetic poles, and a fixed element having N protruding fixed-element magnetic poles with fixed-element magnetic pole teeth opposing the rotating element, wherein the fixed element does not form a closed magnetic path around the entire periphery of the rotating element, the magnetic poles supporting magnetizing windings, sine output windings, and cosine output windings, N being a positive integer greater than 2, comprising:
   generating compensating magnetic flux proximate to opposing sides of $1^{st}$ and $N^{th}$ of the N magnetic poles;
   energizing the magnetizing windings; and
   determining the position of the rotating element based on output voltages generated by the sine and cosine output windings.

14. A method of operating a flux compensated rotational position detector including a rotating element having a plurality of magnetic poles extending over its entire periphery, and a fixed element having protruding fixed-element N magnetic poles with respective fixed-element magnetic pole teeth opposing the rotating element, wherein the fixed element does not form a closed magnetic path around the entire periphery of said rotating element, and magnetizing windings, sine output windings, and cosine output windings are provided on each of the N magnetic poles, N being a positive, even integer, comprising:

tailoring flux profiles adjacent to the $1^{st}$ and $N^{th}$ ones of the N magnetic poles; and determining the position of the rotating element based on voltage applied to the magnetizing windings and output voltages generated by the sine and cosine output windings.

* * * * *